US012497245B1

(12) United States Patent
Shank et al.

(10) Patent No.: US 12,497,245 B1
(45) Date of Patent: Dec. 16, 2025

(54) STORABLE CONVEYOR SYSTEM (71) Applicant: Dynamic Fusion, Inc., Lincoln, NE (US)

(72) Inventors: Justin R. Shank, Lincoln, NE (US); William C. Condon, Lincoln, NE (US)

(73) Assignee: Dynamic Fusion, Inc., Lincoln, NE (US)

( * ) Notice: Subject to any disclaimer, the term of this patent is extended or adjusted under 35 U.S.C. 154(b) by 131 days.

(21) Appl. No.: 18/224,758

(22) Filed: Jul. 21, 2023

Related U.S. Application Data (60) Provisional application No. 63/391,120, filed on Jul. 21, 2022.

(51) Int. Cl.
*B65G 41/00* (2006.01)
*B65G 21/12* (2006.01)

(52) U.S. Cl.
CPC ........... *B65G 41/002* (2013.01); *B65G 21/12* (2013.01); *B65G 41/008* (2013.01)

(58) Field of Classification Search
CPC ..... B65G 41/002; B65G 21/12; B65G 41/008
See application file for complete search history.

(56) References Cited

U.S. PATENT DOCUMENTS

| | | | | |
|---|---|---|---|---|
| 4,734,748 | A * | 3/1988 | Murayama | B65H 31/24 271/294 |
| 7,150,383 | B2 * | 12/2006 | Talken | B26D 7/32 198/588 |
| 10,926,956 | B2 * | 2/2021 | Fulton | B65G 21/14 |
| 11,459,193 | B1 * | 10/2022 | Rice | B65G 65/28 |
| 12,172,843 | B2 * | 12/2024 | Miyahara | B65G 21/14 |
| 2005/0079045 | A1 * | 4/2005 | Talken | B65H 29/66 414/794.5 |

(Continued)

FOREIGN PATENT DOCUMENTS

| | | | | |
|---|---|---|---|---|
| CN | 105858083 | A * | 8/2016 | ........... B65G 41/002 |
| JP | 2003182833 | A * | 7/2003 | |

(Continued)

OTHER PUBLICATIONS

IPSearch History Aug. 13, 2025 UTC; InnovationQ+; https://iq.ip.com/discover (Year: 2025).*

Primary Examiner — Gene O Crawford
Assistant Examiner — Abby A Jorgensen
(74) Attorney, Agent, or Firm — Suiter Swantz IP (57) ABSTRACT

A storable conveyor system may include support structures. The support structures may include a back support, an upper support, and connector beams, wherein the connector beams comprise a lower and an upper connector beam. The support structures may include a first pivot point, wherein the back support and the upper support are coupled at the first pivot point. The support structures may include a second pivot point, wherein the back support and the lower connector beam are coupled at the second pivot point. The support structures may include a third pivot point, wherein the upper support and the upper connector beam are coupled at the third pivot point. The support structures may include a connector pivot point, wherein the lower and the upper connector beam are coupled at the connector point. The storable conveyor system may include a top surface, wherein the top surface comprises a gravity flow conveyor surface.

19 Claims, 8 Drawing Sheets

(56) References Cited

U.S. PATENT DOCUMENTS

| | | | |
|---|---|---|---|
| 2009/0308718 A1* | 12/2009 | Devlin | B07B 1/005 198/861.2 |
| 2019/0366902 A1* | 12/2019 | Bacon-Maldonado, III | B65G 41/008 |
| 2021/0163230 A1* | 6/2021 | Bacon-Maldonado, III | B65G 41/005 |

FOREIGN PATENT DOCUMENTS

| | | | | |
|---|---|---|---|---|
| JP | 2005263360 A | * | 9/2005 | |
| JP | 2007254085 A | * | 10/2007 | |
| JP | 4288597 B2 | * | 7/2009 | |
| JP | 2012121681 A | * | 6/2012 | |
| JP | 2015147660 A | * | 8/2015 | |
| JP | 2020019576 A | * | 2/2020 | |
| KR | 200332077 Y1 | * | 11/2003 | ............ B65G 13/12 |
| KR | 20190051180 A | * | 5/2019 | ............ B65G 21/12 |
| KR | 20200075273 A | * | 6/2020 | ............ B65G 43/00 |

* cited by examiner

STORABLE CONVEYOR SYSTEM

CROSS-REFERENCE TO RELATED APPLICATIONS

The present application claims the benefit under 35 U.S.C. § 119 (e) of U.S. Provisional Application No. 63/391,120, filed Jul. 21, 2022, which is incorporated herein by reference in the entirety.

FIELD

This disclosure generally relates to a gravity flow conveyor. More particularly, the disclosure relates to a gravity flow conveyor where part of the conveyor may be stowed to increase space around a conveyor belt.

BACKGROUND

In high volume shipping scenarios, there is often a limited amount of space on a loading dock when loading shipments onto trucks. In such scenarios, a conveyor belt is used to load trucks before they deliver or transfer shipments. A problem is a conveyor belt often takes up a significant amount of space on the loading docks and make it difficult for employees to move about, particularly from one side of the conveyor belt to the other. The conveyor belt essentially creates a barrier between two sides of the dock, increasing the amount of time required to get individuals or objects from one side to the other. There may therefore be a desire to cure the above deficiencies.

SUMMARY

A storable conveyor system is disclosed, in accordance with one or more embodiments of the present disclosure. In embodiments, the storable conveyor system includes one or more support structures. In embodiments, the one or more support structures include a back support. In embodiments, the one or more support structures include an upper support. In embodiments, the one or more support structures include a plurality of connector beams, wherein the plurality of connector beams comprises a lower connector beam and an upper connector beam, wherein the lower connector beam is coupled to the upper connector beam. In embodiments, the one or more support structures include a first pivot point, wherein the back support and the upper support are coupled at the first pivot point, wherein at least the upper support rotates about the first pivot point. In embodiments, the one or more support structures include a second pivot point, wherein the back support and the lower connector beam are coupled at the second pivot point, wherein at least the lower connector beam rotates about the second pivot point. In embodiments, the one or more support structures include a third pivot point, wherein the upper support and the upper connector beam are coupled at the third pivot point, wherein at least the upper connector beam rotates about the third pivot point. In embodiments, the one or more support structures include a connector pivot point, wherein the lower connector beam and the upper connector beam are coupled at the connector point, wherein at least the lower connector beam and the upper connector beam rotate about the connector pivot point. In embodiments, storable conveyor system includes a top surface, wherein the top surface comprises a gravity flow conveyor surface, wherein the top surface is coupled to the upper support.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

Referring now to FIGS. 1-7, a storable conveyor system 100, primarily for use with conveyor belts in high volume shipping scenarios is disclosed, in accordance with example embodiments of the present disclosure. The storable conveyor system 100 may be used during the in-bound and out-bound sorting process for high volume shipping scenarios. The storable conveyor system 100 may provide greater efficiency for package handlers to remove packages from a moving conveyor belt because the storable conveyor system 100 may allow delivery of packages closer to a van or truck the package handler may be loading, in contrast to a standard conveyor belt.

Figure 1:
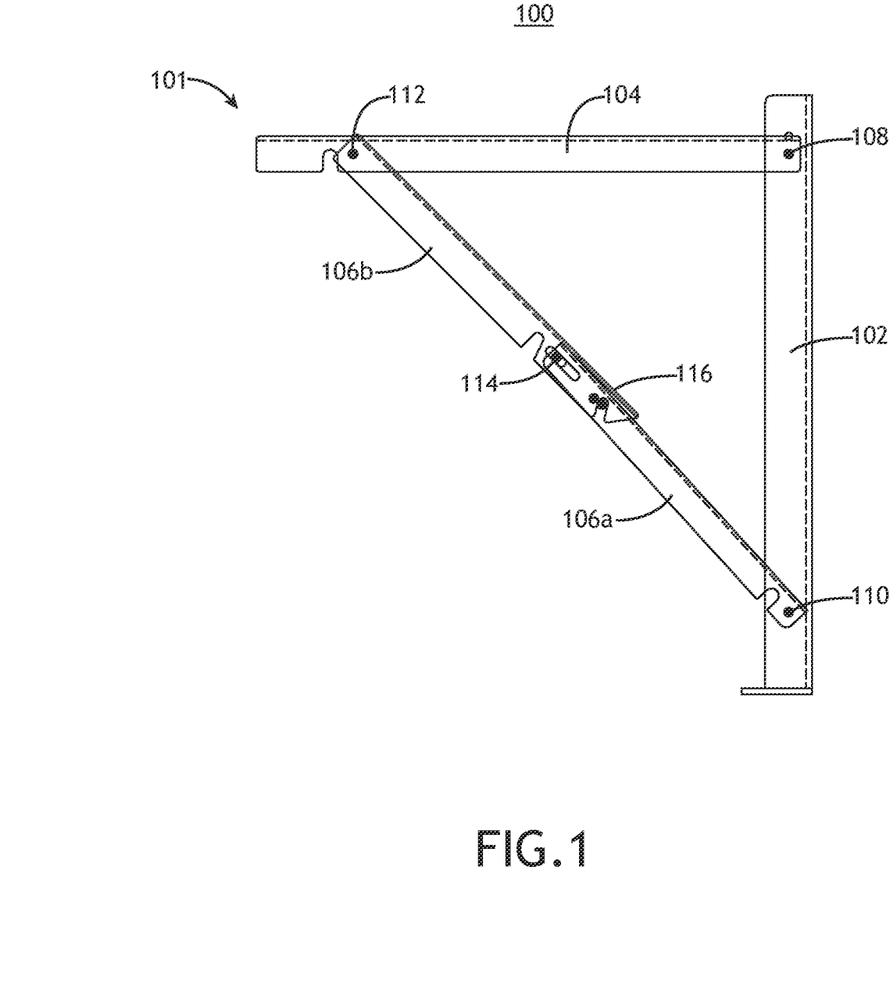
FIG. 1 is a side view of a support structure of a storable conveyor system, in accordance with one or more embodiments of this disclosure.

FIG. 1 is a side view of a support structure 101 of a storable conveyor system 100, in accordance with one or more embodiments of this disclosure. Each storable conveyor system 100 may include one or more support structures 101. For example, two support structures 101 may be used, with a support structure on either end of the storable conveyor system.

The storable conveyor system 100 may generally be deployed in two positions, the up position, and the down position. In this way, the storable conveyor system 100 may be capable of being transitioned between the down position and the up position. The storable conveyor system 100 may either be manually transitioned or automatically transitioned between the up position and the down position. For example, FIG. 1 provides a view of the storable conveyor system 100 in the up position. In the up position, the storable conveyor system 100 is in use, acting as a conveyor in conjunction with the conveyor belt. In the down position, the storable conveyor system 100 is not in use, rotating about a pivot and leaving a space where it had been previously deployed.

In the up position, the storable conveyor system 100 operated to allow goods to be transported along its upper surface. For example, the storable conveyor system 100 may be used with gravity flow conveyors (e.g., a skate wheel conveyor or a gravity roller conveyor). Gravity flow conveyors may broadly encompass any conveyor system that is not motorized.

While in the down position, the storable conveyor system 100 may provide numerous advantages over existing conveyors. For example, the storable conveyor system 100 may allow for usage of a van line unloader. By means of another example, the storable conveyor system 100 may allow employees to move quickly from one side of the conveyor belt to the other (e.g., in emergency scenarios), with limited interruption to the flow of items along the convey belt. Further, when in the down position, employees may simply have added space to work. It is noted that the storable conveyor system 100 may either be implemented in the middle of a conveyor belt or at the end of a conveyor belt.

Further, it is contemplated that one or more storable conveyor systems 100 may be implemented with a single conveyor belt. For example, a single storable conveyor system 100 may be implemented with a conveyor belt (e.g., at the end of the conveyor belt). By way of another example, more than one storable conveyor system 100 may be used with a conveyor belt (e.g., an entire conveyor belt, or certain portions therein, may be made from the storable conveyor system 100).

It is contemplated that the storable conveyor system 100 may extend either wholly or partially into the storage area of a vehicle awaiting items from a conveyor belt (e.g., when the storable conveyor system 100 is located at the end of a conveyor belt). This would allow the conveyor belt to deliver items closer to where they will be placed for transit, reducing the work required for individuals to move and locate the items within the vehicle. After the items have been loaded to the point where the storable conveyor system 100 extends, the storable conveyor system 100 may be put in its down position, allowing for the vehicle to be further loaded without requiring repositioning of the entire conveyor belt. Further, after loading is complete, the storable conveyor system 100 may be clear of the vehicle, allowing the vehicle to secure the items without concern as to the conveyor belt's position.

In embodiments, the support structure 101 of the storable conveyor system 100 may include a back support 102. The back support 102 may be any member suitable for the application. For example, the back support 102 may be a solid piece of metal, a hollow tube or pipe, an I-beam, or the like.

In embodiments, the support structure 101 of the storable conveyor system 100 may include an upper support 104. The upper support 104 may be any member suitable for the application. For example, the upper support 104 may be a solid piece of metal, a hollow tube or pipe, an I-beam, or the like. The upper support 104 may be oriented perpendicular, or near perpendicular, to the back support 102 when the storable conveyor system 100 is in the up position. Further, the upper support 104 may be oriented parallel, or near parallel, to the back support 102 when the storable conveyor system 100 is in the down position.

In embodiments, the support structure 101 of the storable conveyor system 100 may include a plurality of connector beams 106 (e.g., a lower connector beam 106a and an upper connector beam 106b). Similar to the back support 102 and upper support 104, the connector beams 106 may be formed from any member suitable for the application. However, certain design embodiments of the present disclosure, detailed later, may dictate certain choices with respect to the style or type of member used. The connector beams 106 may include various restriction mechanisms 116 (e.g., a mechanism that restricts rotation of the upper support 104 beyond a certain degree) such that the connector beams 106 may engage (e.g., interact) with one another, as well as the upper support 104 and the back support 102 to hold a mass when the storable conveyor system 100 is in the up position (e.g., the restriction mechanism 116 may lock the storable conveyor system 100 in an up position). The restriction mechanism 116 may interact at the connector pivot point 114. The restriction mechanisms 116 may then disengage such that the storable conveyor system 100 may rotate (e.g., transition) to the down position. The restriction mechanism 116 may disengage though things such as, but not limited to, a cable lock and release system, pressure a force applied at the connector pivot point 114, and/or an upwards force applied at the upper support. Such restriction mechanisms 116 may include, but are not limited to, notches, holes, angled faces, or the like.

The back support 102 and the upper support 104 may include a first pivot point 108. The back support 102 and the upper support 104 may be coupled via the first pivot point 108 (e.g., via a pin or hinge). The first pivot point 108 may allow for the upper support 104 to rotate about the first pivot point 108, constrained in one direction of rotation by the back support 102 and the opposite direction of rotation by the length of the plurality of connector beams 106. In one embodiment, this constrains the upper support 104 to an approximately 90° arc of rotation. Rotation about the first pivot point 108 allows the upper support 104 to rotate from the down position to the up position.

For example, rotation about the first pivot point 108 to approximately 90° may cause the restriction mechanisms 116 of the connector beams 106 to interact such that the storable conveyor system 100 is locked in the up position. Further, the restriction mechanisms 116 of the connector beams 106 may be configured such that rotation past 90° disengages the restriction mechanisms 116 such that the storable conveyor system 100 may be rotated to the down position.

The back support 102 may include a second pivot point 110. A lower connector beam 106a may couple to the back support 102 at the second pivot point 110 of the back support 102 (e.g., via a pin or hinge). At the second pivot point 110, the lower connector beam 106a may rotate about the axis of the second pivot point 110, while the back support 102 remains stationary with respect to this rotational motion.

The upper support 104 may include a third pivot point 112. An upper connector beam 106b may couple to the upper support 104 at the third pivot point 112 of the upper support 104 (e.g., via a pin or hinge). At the third pivot point 112, the upper connector beam 106b may rotate about the axis of the third pivot point 112, while the upper support 104 remains stationary with respect to this rotational motion (e.g., while rotating about the first pivot point 108).

The lower connector beam 106a and the upper connector beam 106b may each include a connector pivot point 114. At the connector pivot point 114, the lower connector beam 106a and the upper connector beam 106b are coupled to each other (e.g., via a pin or hinge). The connector pivot point 114 allows both the lower connector beam 106a and the upper connector beam 106b to rotate around the connector pivot point 114. This rotation, along with the rotation of the lower connector beam 106a about the second pivot point 110 and the rotation of the upper connector beam 106b about the third pivot point 112 allows the connector beams 106 to go from the down position, where the lower connector beam 106a and the upper connector beam 106b are approximately parallel to the back support 102 and/or the upper support 104, to the up position, where the lower connector beam 106a and the upper connector beam 106b are colinear with each other and are at an approximately 45° angle with respect to the back support 102 and/or the upper support 104.

In embodiments, the coupled nature of the design, combined with the rotational freedom of each of the members, means rotation originally about a single pivot point will result in rotation occurring at the other pivot points. In this way, force can be applied at a variety of locations, while still resulting in moving the storable conveyor system 100 from the down position to the up position.

In embodiments, the rotational motion (e.g., rotating from the up position to the down position) of the storable conveyor system 100 will be limited in one direction by the back support 102 and upper support 104 (e.g., the back support 102 and the upper support 104 will come in contract and block further rotation). In the other direction of motion (e.g., rotating from the down position to the up position), the rotational motion of the lower connector beam 106a and upper connector beam 106b will be limited by the interface of the two lower connector beam 106a and the upper connector beam 106b at the connector pivot point 114 (e.g., the restriction mechanisms 116 on the lower connector beam 106a and the upper connector beam 106b prevent further rotation).

The storable conveyor system 100 described above may be duplicated and deployed on either side of the conveyor belt, or implemented as many times as required to support the conveyor belt. Further, the above description may apply to single members that span a width approximately as wide as the conveyor belt itself.

Further, the lower connector beam 106a and the upper connector beam 106b may include a lower connector support and an upper connector support (not pictured). These connector supports may be utilized to allow for a longer upper support 104 (resulting in a longer moment arm about the connector pivot point 114 and the second pivot point 110), or simply to allow heavier loads to be passed across the storable conveyor system 100. The lower connector support and upper connector support may be made from any material suitable to add sufficient strength to the storable conveyor system 100.

In embodiments, further supports may be added as necessary to any of the aforementioned members in order to achieve the level of support required in order to be able to support certain loads.

The storable conveyor system 100 may be constructed of any material known in the art to be suitable for such an application. For example, the arm may be constructed of aluminum, steel, stainless steel, or the like. Further, various elements of the storable conveyor system 100 may be constructed of any combination of suitable materials (e.g., the back support 102 may be constructed from aluminum, while the upper support 104 may be constructed of steel).

Each pivot point may be designed using any component suitable for producing rotation around a fixed axis (e.g., a pin, a rivet, a hinge, or the like). Further, at each pivot point described herein, it is contemplated that the members mating at that pivot point may either be removably coupled (e.g., a pin) or permanently coupled (e.g., a welded pin). It is also noted that each pivot point may use the same type of component suitable to produce rotation. However, the various pivot points may use different components suitable to produce rotation.

The lengths of the back support 102 and the upper support 104 may be any length suitable for the application. For example, the back support 102 may be designed to be the same height as the conveyor belt where the storable conveyor system 100 is to attach. By means of another example, the back support 102 may be shorter than the conveyor belt where the storable conveyor system 100 is to attach, such as in a gravity fed conveyor belt. Further, the upper support 104 may be shorter, longer, or the same length as the back support 102, depending on the application of the storable conveyor system 100.

The total length of the connector beams 106 may be defined by the user. For example, the connector beams 106 may be of a length where the upper support 104 is parallel to the surface (e.g., the ground) the storable conveyor system 100 is deployed (e.g., the upper support 104 is perpendicular, or largely perpendicular, to the back support 102). By way of another example, the connector beams 106 may be of a length where the upper support 104 is not parallel with the ground (e.g., the upper support 104 is not perpendicular to the back support 102). Further, the lower connector beam 106a and the upper connector beam 106b may be of any length relative to each other (e.g., the lower connector beam 106a may be longer, shorter, or the same length as the upper connector beam 106b).

The storable conveyor system 100 may be operated in a variety of ways. First, the storable conveyor system 100 may be operated manually. For example, an individual may lift the entirety of the upper support 104 to the up position. By way of another example, an individual may be aided in deploying the storable conveyor system 100 to the up position, such with air shock assistance, or the like.

The storable conveyor system 100 may also be operated automatically. When being automatically operated, the storable conveyor system will move from the down position to the up position without any force being applied from a user. Automatic deployment of the storable conveyor system 100 may be achieved through use of pneumatic, electric, or hydraulic means, or any other suitable means.

In instances of automatic deployment, a controller, a processor, and/or a user interface may be used to allow a user to select the degree of deployment (or any other suitable measure for a user to reliably know the extent to which the storable conveyor system 100 would be deployed). For example, the storable conveyor system 100 may be deployed at any angle between the up position and the down position. The storable conveyor system 100 may then use sensors to measure the degree of deployment, relative to a selected reference plane (e.g., the ground). A user could determine the desired angle of deployment and enter it through the user interface and the storable conveyor system 100 would utilize one of the means previously discussed (e.g., pneumatic, electric, or hydraulic) in order to achieve the desired angle or level of deployment.

The storable conveyor system 100 may have the ability to be secured and released as a whole. In one embodiment, the design naturally locks when deployed in the up position. In this instance, the storable conveyor system 100 may be configured such that there is a force acting at the connector pivot point 114 to prevent the storable conveyor system 100 from collapsing into the down position when force is applied to the top of the upper support 104 (e.g., when something is passed across the upper support 104).

In one nonlimiting example, the storable conveyor system 100 may be stowed by applying pressure (e.g., a force) at or near the connector pivot point 114 point to disengage the natural lock. By way of another example, a user may lift the upper support 104 such that the upper support 104 moves beyond perpendicular with the back support 102, which may allow the storable conveyor system 100 to be transitioned from the up position to the down position.

In embodiments, the storable conveyor system 100 may be secured and released utilizing a cable lock and release system. As described above, the storable conveyor system 100 naturally locks into place when deployed to the up position. However, instead of manually applying pressure at or near the connector pivot point 114, a force is applied by pulling on a cable attached at the connector pivot point 114. This cable would apply an upward motion to free the lock, while keeping the hands of a user away from the falling upper support 104.

Further, one or more of the pivot points may also include a locking mechanism (e.g., a manual locking mechanism or an automatic locking mechanism) to prevent unwanted movement while in the up position or the down position (e.g., by restricting rotation at one or more of the pivot points). Each locking mechanism may need to be manually secured, or each locking mechanism may automatically secure the pivot point upon deployment. In this way, one, some, or all of the first pivot point 108, the second pivot point 110, the third pivot point 112, and/or the connector pivot point 114 may include a manual locking mechanism or an automatic locking mechanism. For example, upon deployment of the storable conveyor system 100, a user may need to secure clasps, or the like at each pivot point to secure it. Conversely, a mechanism may contain a rotationally locking mechanism, or the like, which would automatically lock the storable conveyor system 100 when deploying it. In either instance, the locking mechanism would have to be manually unlocked to move the storable conveyor system 100 to the down position.

In embodiments, the locking mechanism may be built into the body of the connector beams 106 (e.g., part of the locking mechanism may be part of the lower connector beam 106a and part of the locking mechanism may be part of the upper connector beam 106b). For example, the locking mechanism may include a pin in a slot that locks the connector pivot point 114 such that the storable conveyor system 100 cannot rotate past the point when it is locked (e.g., the storable conveyor system 100 cannot rotate between the up position and the down position). Once a user lifts the storable conveyor system 100 (e.g., by applying an upward force at the upper support 104) the pin may be released such that the storable conveyor system 100 may be rotated between the up position and the down position.

In an embodiment, the storable conveyor system 100 may be secured when it is in the down position. The storable conveyor system may be secured by any means appropriate. For example, a strap may be wrapped around the assembly to keep the upper support 104 from moving. By means of another example, the upper support 104 and/or the back support may have a component allowing the back support 102 and the upper support 104 to be attached to each other when the storable conveyor system 100 is in the down position.

Attached to the upper support 104 may be any surface suitable for moving objects in a fashion similar to a conveyor belt. For example, this surface may be an unpowered conveyor surface, such as a skate wheel surface, standard gravity roller surface, or the like. Further, the surface may also be a powered conveyor surface, such as an electrically powered belt conveyor, or the like.

The storable conveyor system 100 may be integrated into an existing conveyor belt assembly or deployed as an individual assembly, proximate to the end of an existing conveyor belt. Broadly speaking, the storable conveyor system 100 may be mounted to the conveyor belt or another device on any number of ways (e.g., with one or more fasteners). For example, the storable conveyor system 100 may be integrated into existing conveyor belts through one of the following means: permanently coupled to a conveyor belt (e.g., welded), semi-permanently coupled (e.g., straps or clamps), or not coupled (e.g., placed near the end of a conveyor belt), or the like. It is contemplated that the storable conveyor system 100 may be counted (or otherwise coupled) to an additional conveyor belt, or any other device, via the back support 102.

Further, the storable conveyor system 100 may be integrated through construction of conveyor belts into new conveyor belts, where the storable conveyor system 100 is part of a new conveyor belt construction. The storable conveyor system 100 may also be manufactured as part of a new conveyor belt.

The storable conveyor system 100 may be mounted on wheels (not pictured). In embodiments, wheels are mounted at points on the storable conveyor system 100 assembly, allowing easier movement of the storable conveyor system 100 when extra space is desired beyond the space already provided by positioning the storable conveyor system 100 in the down position. Further, in instances where the storable conveyor system 100 is separate from an existing conveyor belt, the storable conveyor system 100 may be made of components which are light enough to allow it to be manually lifted and carried away.

Figure 2:
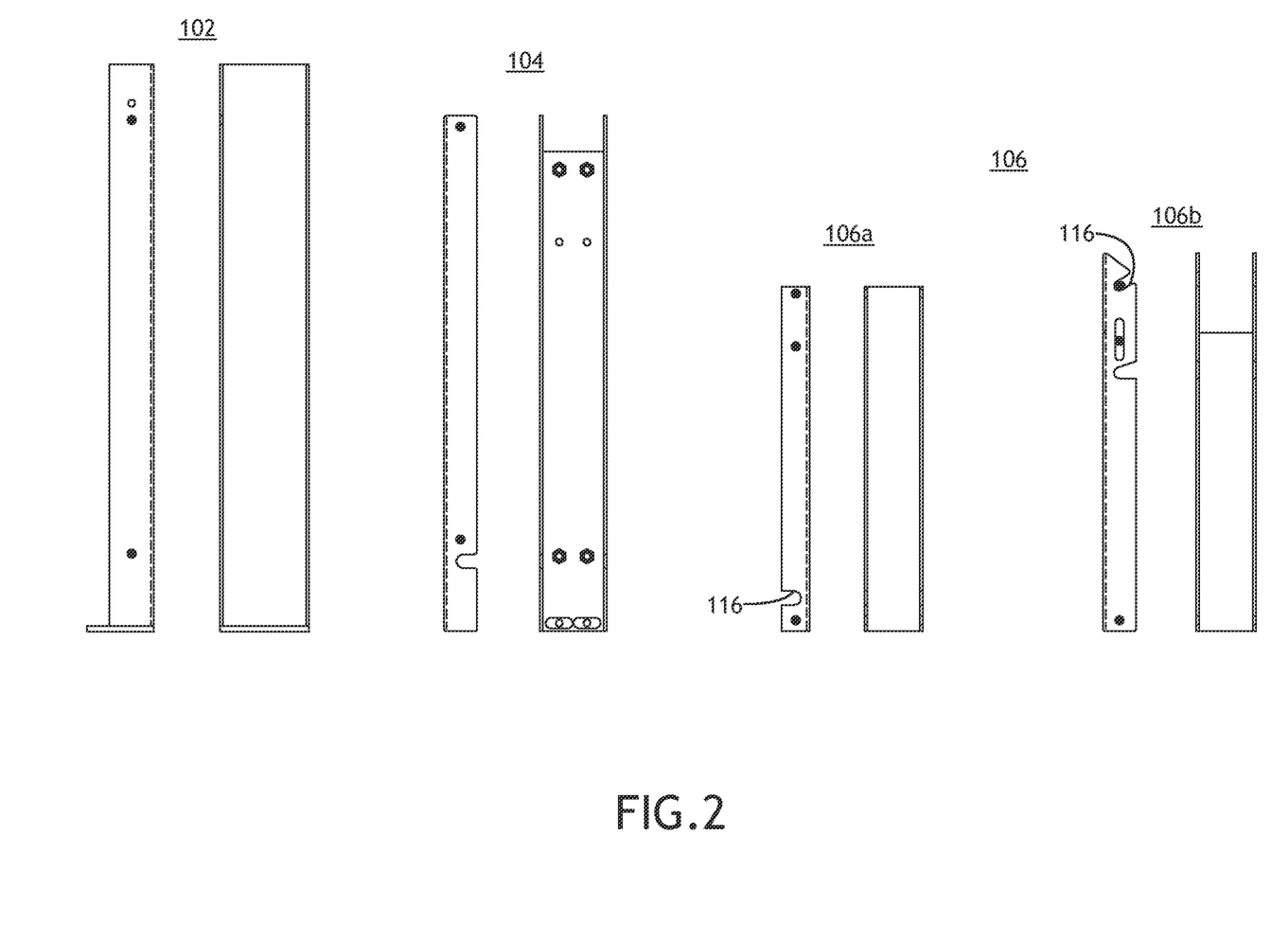
FIG. 2 is a collection of side and front views of various components of the storable conveyor system, in accordance with one or more embodiments of the present disclosure.

FIG. 2 is a collection of side and front views of various components of the storable conveyor system 100, in accordance with one or more embodiments of the present disclosure.

For example, FIG. 2 shows nonlimiting examples of possible constructions in terms of side views and front views of the back support 102, upper support 104, and the connector beams 106 (e.g., the lower connector beam 106a and the upper connector beam 106b).

Figure 3:
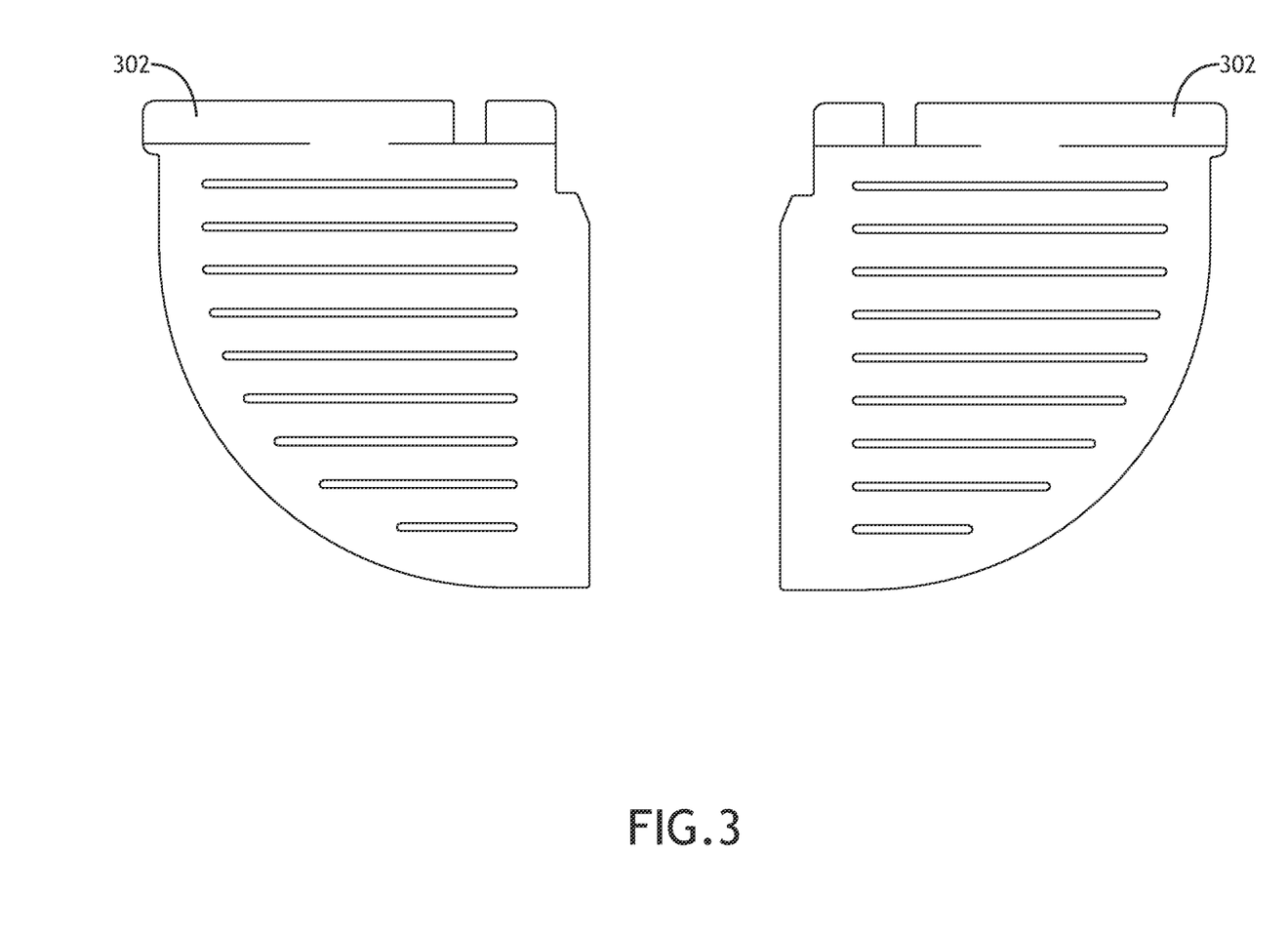
FIG. 3 is a front view of two guards, where the guards are mirror images of each other, in accordance with one or more embodiments of the present disclosure.

FIG. 3 is a front view of two guards 302, where the guards 302 are mirror images of each other, in accordance with one or more embodiments of the present disclosure.

For example, the guards 302 may be attached to either side of the upper support 104. In this way, the guards 302 may rotate with the storable conveyor system 100 such that they stow and are out of the way when the storable conveyor system 100 is in the down position. Further, the guards 302 may protect a user from injury (e.g., by blocking the rotating components of the support structure 101 of the storable conveyor system 100) when the storable conveyor system 100 is being transitioned from the up position to the down position, or vice versa. For example, the guards 302 may be placed on either side of each support structure 101. In this way, the guards 302 on either side of the support structure 101 may prevent interaction with at least one of the first pivot point 108, the second pivot point 110, the third pivot point 112, or the connector pivot point 114.

Figure 4:
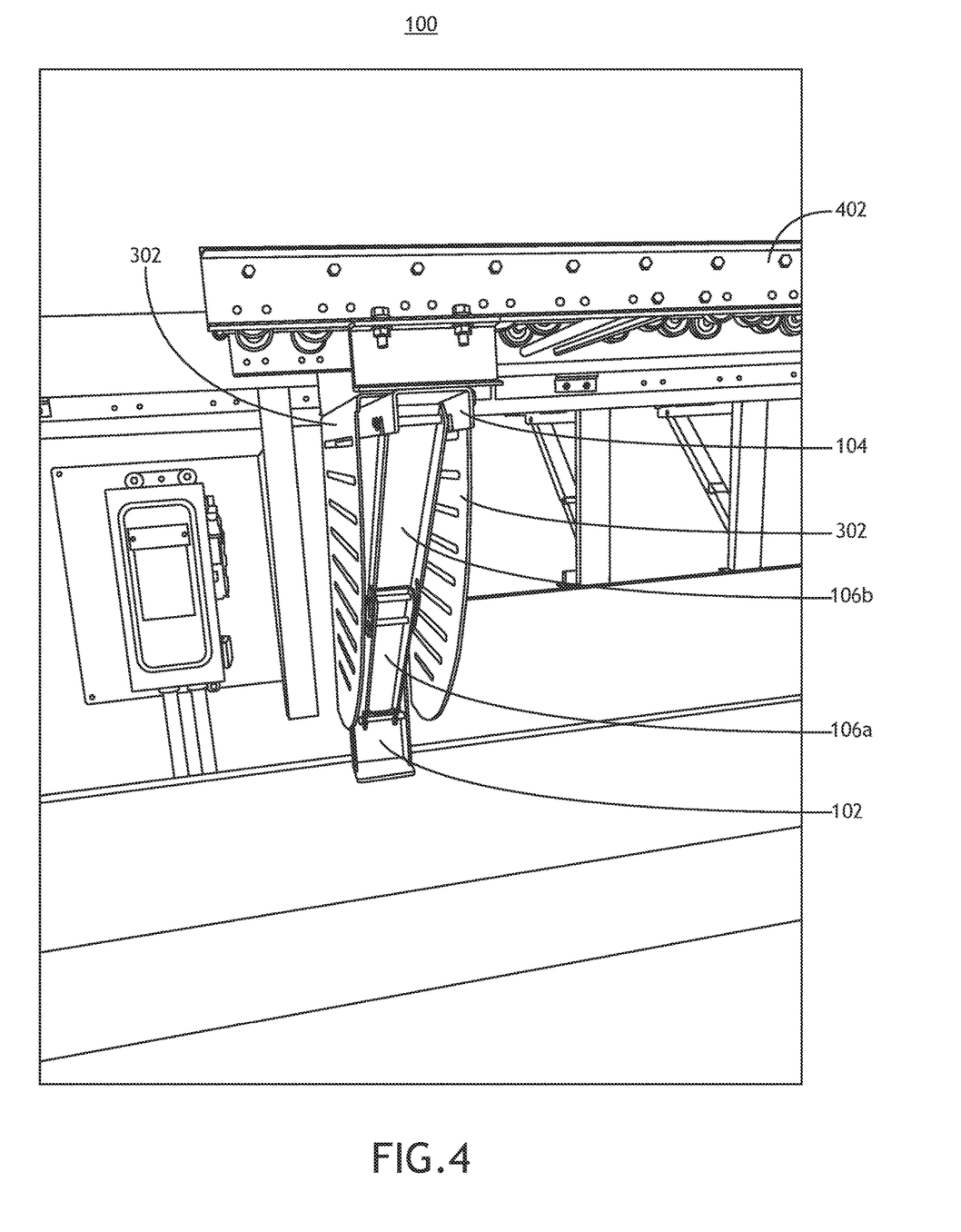
FIG. 4 is a front view of the storable conveyor system a top surface, in accordance with one or more embodiments of the present disclosure.

FIG. 4 is a front view of the storable conveyor system 100 including a top surface 402, in accordance with one or more embodiments of the present disclosure.

In embodiments, the storable conveyor system 100 may include a top surface 402. The top surface 402 may be configured as a gravity flow conveyor. For example, the top surface 402 may be configured as a skate wheel conveyor, a gravity roller conveyor, or the like. By configuring the top surface 402 of the storable conveyor system 100 as a gravity flow conveyor, individual storable conveyor systems 100 may be stowed (e.g., the storable conveyor system 100 is placed in the down position) when there is more than one storable conveyor system 100 aligned next to each other, which may allow for access to other desired areas of a workspace.

In FIG. 4, the storable conveyor system 100 is positioned in the up position. The storable conveyor system 100 may include a top surface 402. The top surface 402 may be coupled to the upper support 104 (e.g., via bolds, screws, clamps, or the like). Further, the top surface 402 may be offset from the upper support 104 (e.g., as shown in FIG. 4) or placed directly on the upper support 104.

Additionally, FIG. 4 shows guards 302 coupled to either side of the upper support 104. In this way, the guards 302 are configured to prevent access to the connector beams 106 and/or the various pivots of the storable conveyor system 100.

Figure 5:
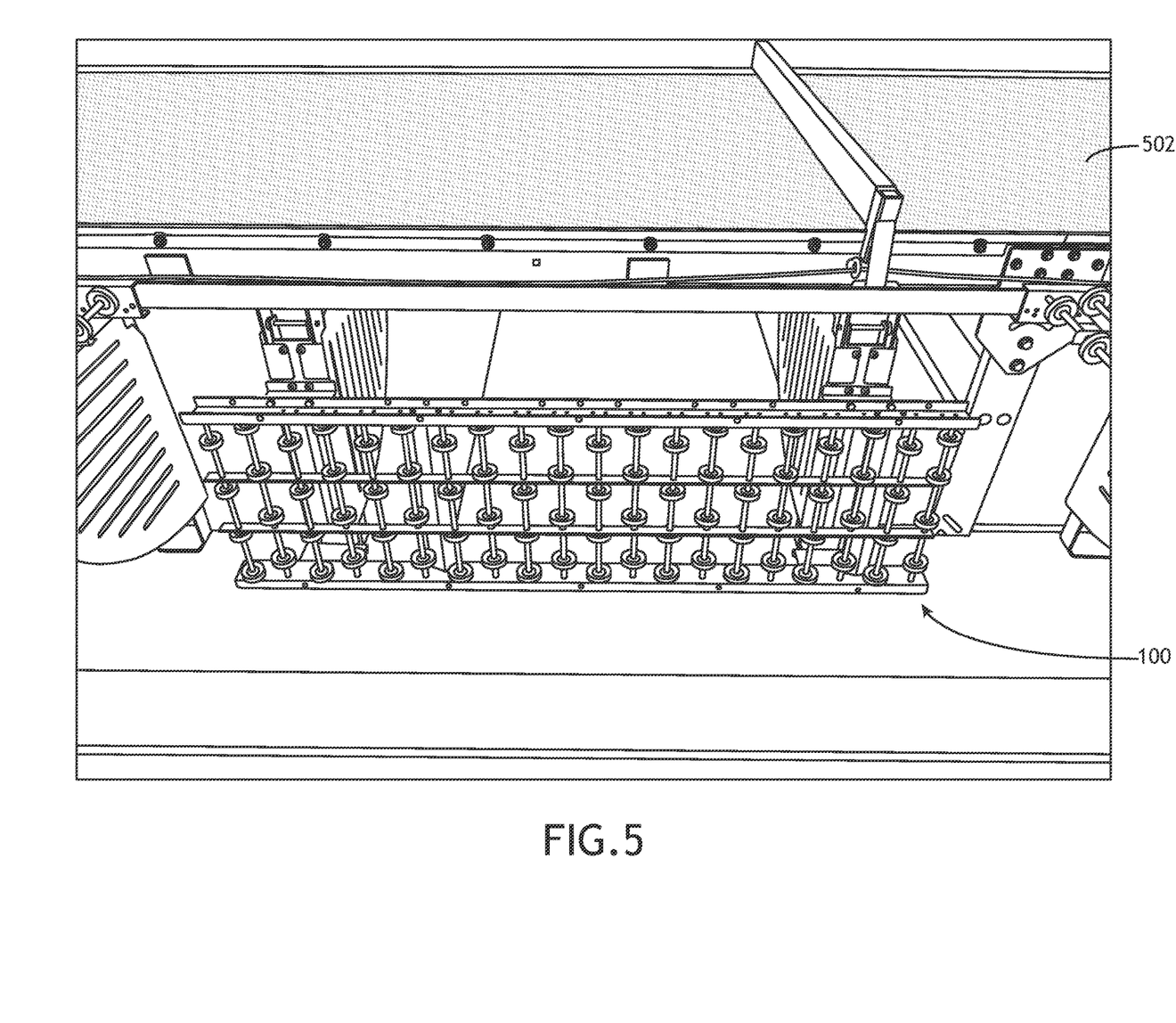
FIG. 5 is a perspective view of the storable conveyor system integrated into a conveyor belt, in accordance with one or more embodiments of the present disclosure.

FIG. 5 is a perspective view of the storable conveyor system 100 integrated into a conveyor belt, in accordance with one or more embodiments of the present disclosure.

For example, in FIG. 5 the storable conveyor system 100 is configured as a gravity flow conveyor belt (e.g., the top surface 402 of the storable conveyor system 100 includes a gravity flow conveyor surface). As shown in FIG. 5, the storable conveyor system may either be coupled to, or located proximal to, an additional conveyor belt 502. In this way, the storable conveyor system 100 and the additional conveyor belt 502 may convey items in the same direction.

Further, the storable conveyor system 100 and the additional conveyor belt 502 may convey items in different ways. For example, the storable conveyor system 100 may be a gravity flow conveyor and the additional conveyor belt 502 may be a motorized conveyor belt.

Figure 6A:
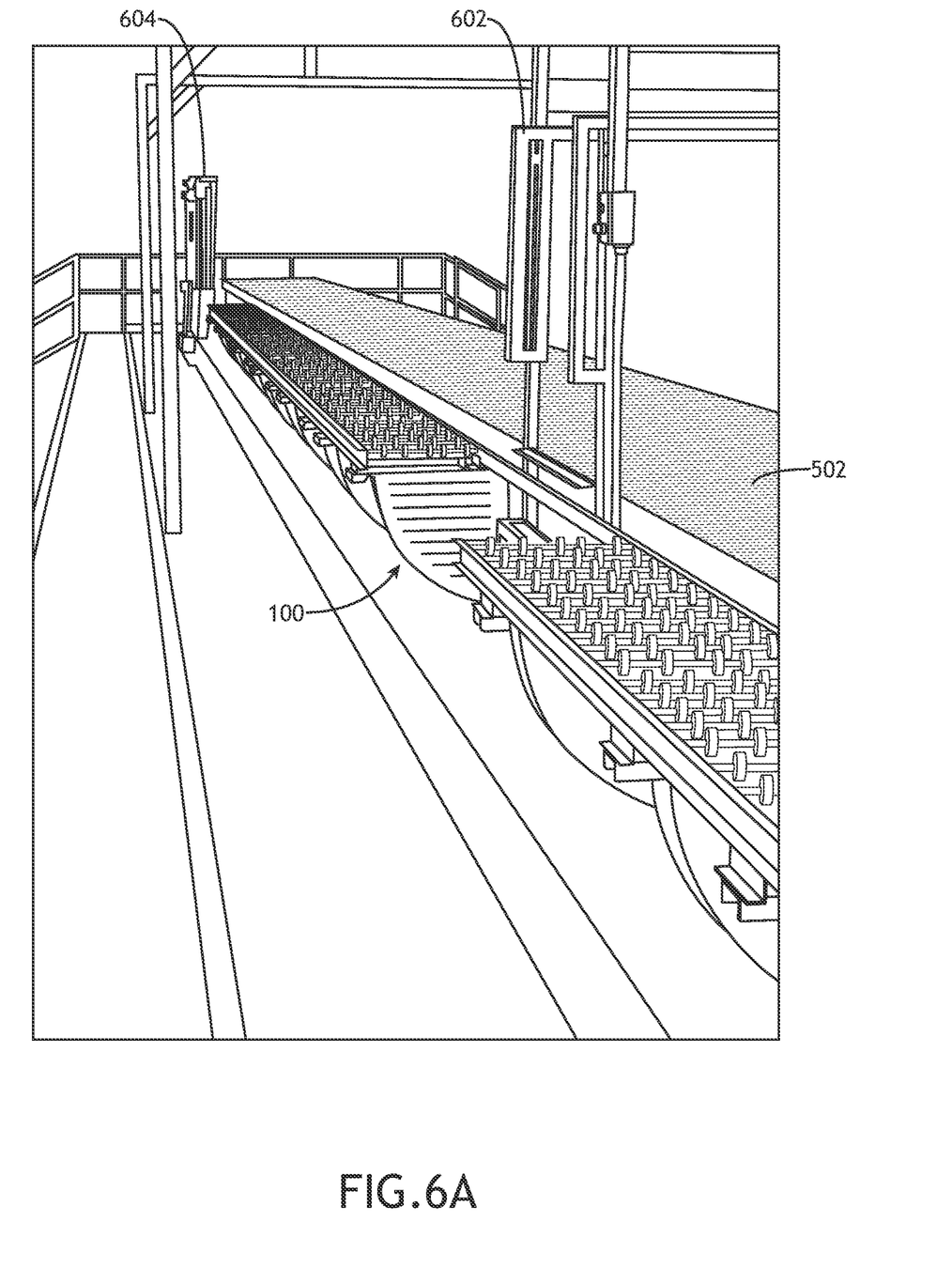
FIG. 6A is a perspective view of a set of storable conveyor systems with some storable conveyor systems in the up position and one storable conveyor system in the down position, in accordance with one or more embodiments of this disclosure.

FIG. 6A is a perspective view of a set of storable conveyor systems 100 with some storable conveyor systems 100 in the up position and one storable conveyor system 100 in the down position, in accordance with one or more embodiments of this disclosure.

For example, in FIG. 6A the storable conveyor system 100 in the down position may correspond to an unloader port 602. The unloader port 602 may permit an unloader 604 to reach an additional conveyor belt 502 (e.g., a conveyor belt that is coupled to the storable conveyor system 100). In this way, the unloader 604 may have access to the additional conveyor belt 502 before the end of the additional conveyor belt 502 (e.g., because the storable conveyor system 100 is in the down position). Further, the unloader 604 and/or the unloader port 602 may be on tracks, or otherwise positionable, such that items may be unloaded from the additional conveyor belt 502 at various positions.

Figure 6B:
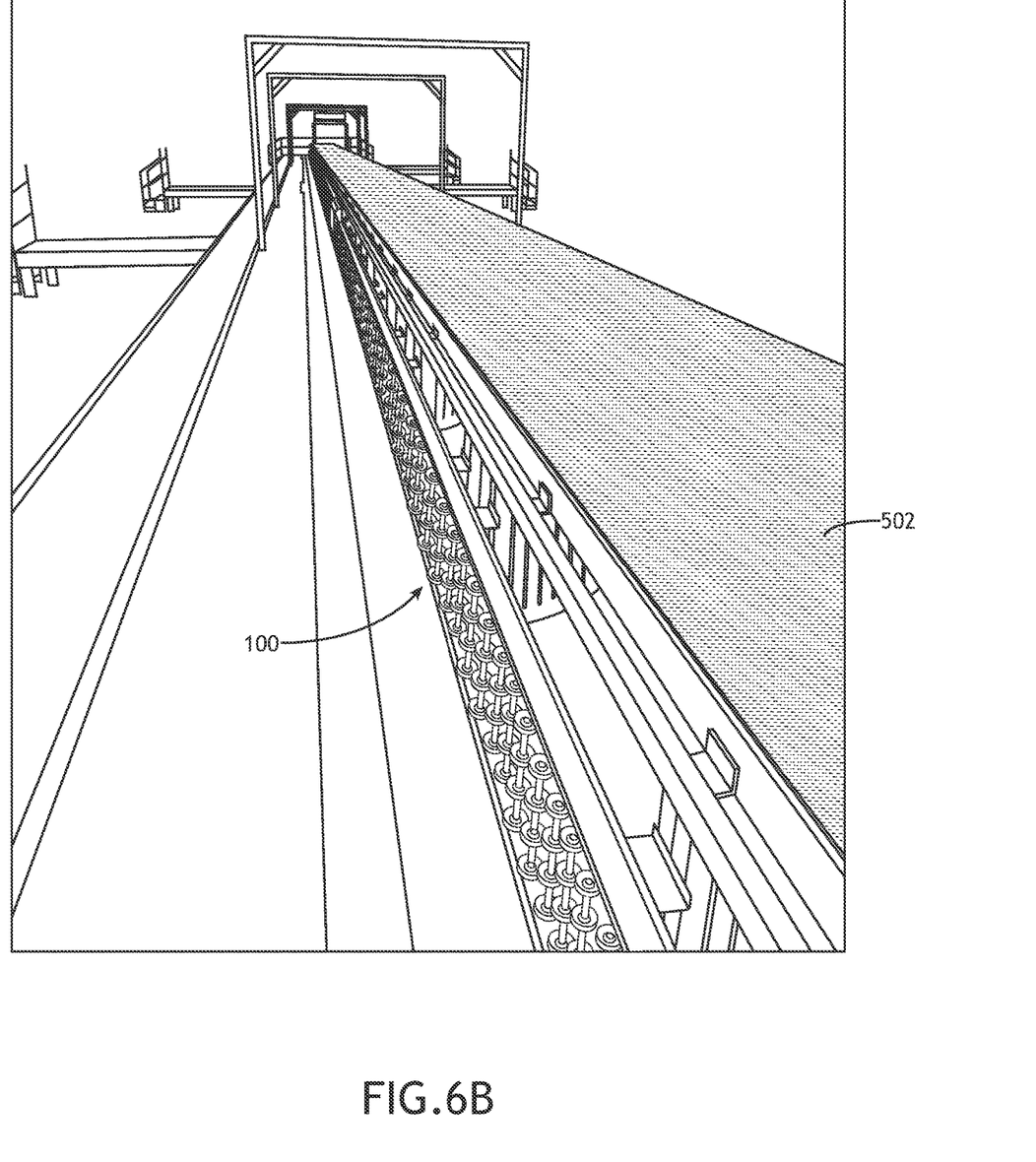
FIG. 6B is a perspective view of a set of storable conveyor systems with all storable conveyor systems in the down position, in accordance with one or more embodiments of this disclosure.

FIG. 6B is a perspective view of a set of storable conveyor systems 100 with all storable conveyor systems 100 in the down position, in accordance with one or more embodiments of this disclosure.

For example, the configuration in FIG. 6B may correspond to a situation when the storable conveyor systems 100 are not necessary (e.g., because the flow of items can be handled with the additional conveyor belt 502). Therefore, all of the storable conveyor systems 100 disposed next to the additional conveyor belt 502 may be put in the down position so that there may be access to the additional conveyor belt 502.

As shown in FIGS. 6A and 6B, the storable conveyor system 100 may be disposed on one or more sides of the additional conveyor belt 502. However, the storable conveyor system 100 may also be disposed at the end of the additional conveyor belt 502 (e.g., a location where items may be taken off of the additional conveyor belt 502 or put on the additional conveyor belt 502).

Figure 7:
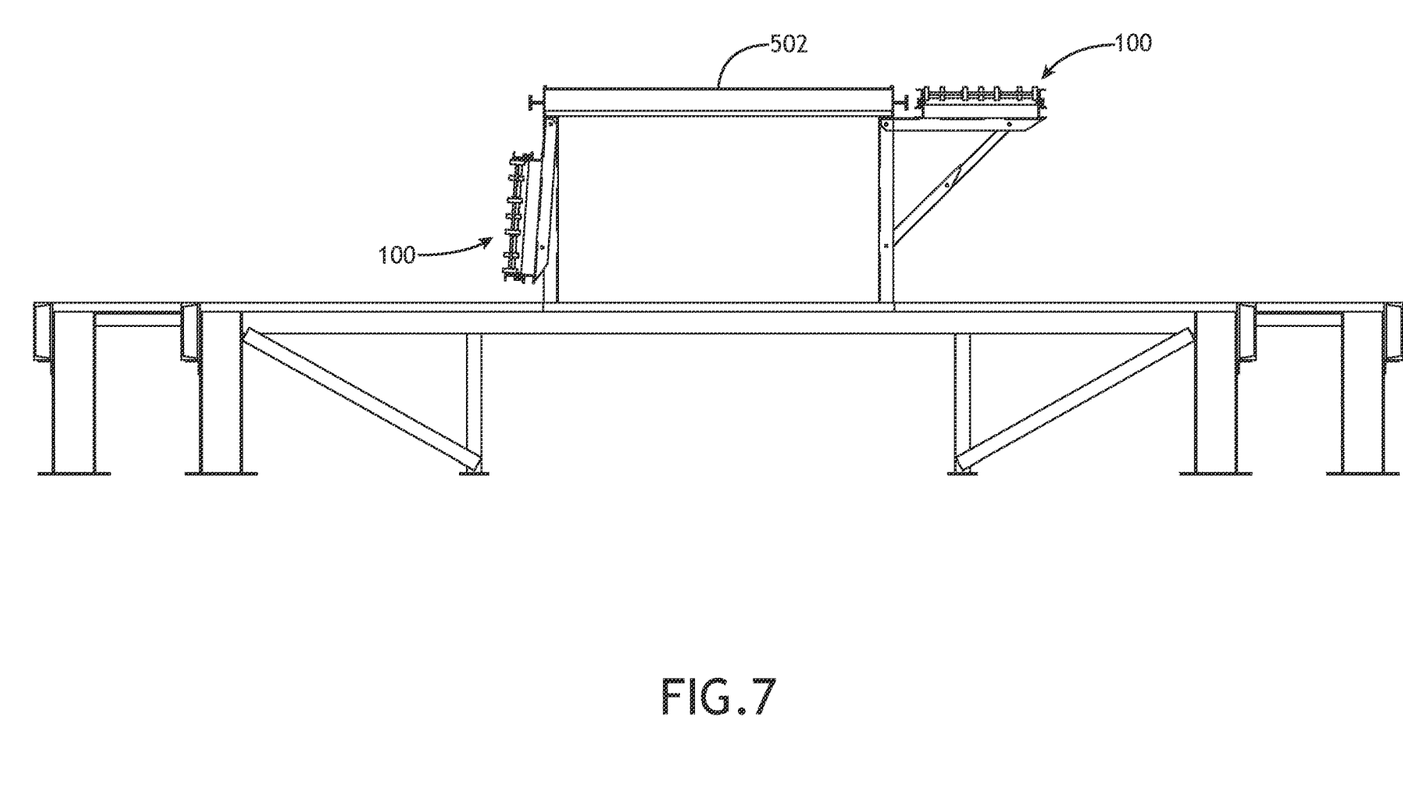
FIG. 7 is a front view of a conveyor belt with storable conveyor systems located on either side of the conveyor belt, in accordance with one or more embodiments of this disclosure.

FIG. 7 is a front view of a conveyor belt with storable conveyor systems 100 located on either side of the additional conveyor belt 502, in accordance with one or more embodiments of this disclosure.

It may be advantageous for each side of the additional conveyor belt 502 to have a storable conveyor system (e.g., to accommodate an extra flow of items). However, because each storable conveyor system 100 is independently positionable in either the up or down position, one side may have all of the storable conveyor systems 100 in the up position, while the other side has all of the storable conveyor systems 100 in the down position. Further, individual storable conveyor systems 100 on each side may positioned in either the up or the down position (e.g., to accommodate an unloader 604, pass items along the storable conveyor systems 100, access the additional conveyor belt 502, or the like).

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A system, comprising:
    a storable conveyor system, comprising:
        one or more support structures, wherein the one or more support structures comprise:
            a back support;
            an upper support;
            a plurality of connector beams, wherein the plurality of connector beams comprises a lower connector beam and an upper connector beam, wherein the lower connector beam is coupled to the upper connector beam;
        a first pivot point, wherein the back support and the upper support are coupled at the first pivot point, wherein at least the upper support rotates about the first pivot point, wherein the first pivot point is located at an end of the back support and the upper support;
        a second pivot point, wherein the back support and the lower connector beam are coupled at the second pivot point, wherein at least the lower connector beam rotates about the second pivot point;
        a third pivot point, wherein the upper support and the upper connector beam are coupled at the third pivot point, wherein at least the upper connector beam rotates about the third pivot point; and
        a connector pivot point, wherein the lower connector beam and the upper connector beam are coupled at the connector pivot point, wherein at least the lower connector beam and the upper connector beam rotate about the connector pivot point; and
        a top surface, wherein the top surface comprises a gravity flow conveyor surface, wherein the top surface is coupled to the upper support; and
    an additional conveyor belt, wherein the storable conveyor system is disposed on one or more sides of the additional conveyor belt and runs in parallel with the additional conveyor belt.

2. The system of claim 1, wherein the storable conveyor system further comprises one or more guards configured to rotate with the storable conveyor system.

3. The system of claim 2, wherein the one or more guards are coupled to the upper support, wherein the one or more guards prevent interaction with at least one of the first pivot point, the second pivot point, the third pivot point, or the connector pivot point.

4. The system of claim 1, wherein the storable conveyor system is configured for a down position and an up position.

5. The system of claim 4, wherein the storable conveyor system is manually transitioned between the down position and the up position.

6. The system of claim 4, wherein the storable conveyor system is automatically transitioned between the down position and the up position.

7. The system of claim 1, wherein each of the plurality of connector beams comprise one or more restriction mechanisms.

8. The system of claim 7, wherein the one or more restriction mechanisms of the each of the plurality of connector beams interact at the connector pivot point to lock the storable conveyor system in an up position.

9. The system of claim 8, wherein the one or more restriction mechanisms of the each of the plurality of connector beams disengage to allow a transition to a down position using a cable lock and release system.

10. The system of claim 8, wherein the one or more restriction mechanisms of the each of the plurality of connector beams disengage to allow a transition to the down position by applying a force at the connector pivot point.

11. The system of claim 8, wherein the one or more restriction mechanisms of the each of the plurality of connector beams disengage to allow a transition to the down position by applying a force at the upper support.

12. The system of claim 1, wherein at least one of the first pivot, the second pivot, the third pivot, or the connector pivot comprise a manual locking mechanism.

13. The system of claim 1, wherein the storable conveyor system is integrated with an existing conveyor belt.

14. The system of claim 1, wherein the storable conveyor system is manufactured as part of a new conveyor belt.

15. The system of claim 1, wherein the storable conveyor system is mounted on wheels.

16. The system of claim 1, further comprising:
    an unloader port; and
    an unloader, wherein the unloader port is configured to permit the unloader to access the additional conveyor belt.

17. The system of claim 1, wherein the storable conveyor system is disposed on each side of the additional conveyor belt and are independently positionable.

18. The system of claim 1, wherein the storable conveyor system is additionally disposed at an end of the additional conveyor belt.

19. A storable conveyor system, comprising:
one or more support structures, wherein the one or more support structures comprise:
- a back support;
- an upper support;
- a plurality of connector beams, wherein the plurality of connector beams comprises a lower connector beam and an upper connector beam, wherein the lower connector beam is coupled to the upper connector beam;
- a first pivot point, wherein the back support and the upper support are coupled at the first pivot point, wherein at least the upper support rotates about the first pivot point, wherein the first pivot point is located at an end of the back support and the upper support;
- a second pivot point, wherein the back support and the lower connector beam are coupled at the second pivot point, wherein at least the lower connector beam rotates about the second pivot point;
- a third pivot point, wherein the upper support and the upper connector beam are coupled at the third pivot point, wherein at least the upper connector beam rotates about the third pivot point; and
- a connector pivot point, wherein the lower connector beam and the upper connector beam are coupled at the connector pivot point, wherein at least the lower connector beam and the upper connector beam rotate about the connector pivot point;
- a top surface, wherein the top surface comprises a gravity flow conveyor surface, wherein the top surface is coupled to the upper support;
- a controller and a processor, wherein the controller and the processor are configured to allow a user to select a degree of deployment, wherein the degree of deployment may be any angle between an up position and a down position; and
- one or more sensors, configured to measure the degree of deployment relative to a selected reference plane.

* * * * *